(12) United States Patent
Li

(10) Patent No.: US 9,612,975 B2
(45) Date of Patent: Apr. 4, 2017

(54) PAGE CACHE DEVICE AND METHOD FOR EFFICIENT MAPPING

(71) Applicant: Samsung Electronics Co., Ltd., Suwon-si, Gyeonggi-do (KR)

(72) Inventor: ZiHui (Jason) Li, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 64 days.

(21) Appl. No.: 14/667,673

(22) Filed: Mar. 24, 2015

(65) Prior Publication Data
US 2016/0147670 A1    May 26, 2016

Related U.S. Application Data

(60) Provisional application No. 62/082,596, filed on Nov. 20, 2014.

(51) Int. Cl.
| | | |
|---|---|---|
| G06F 12/08 | (2016.01) | |
| G06F 12/10 | (2016.01) | |
| G06F 12/1045 | (2016.01) | |
| G06F 12/1009 | (2016.01) | |
| G06F 12/0873 | (2016.01) | |

(52) U.S. Cl.
CPC ...... *G06F 12/1054* (2013.01); *G06F 12/0873* (2013.01); *G06F 12/1009* (2013.01); G06F 2212/608 (2013.01); G06F 2212/65 (2013.01)

(58) Field of Classification Search
CPC .......... G06F 12/0873; G06F 12/1009; G06F 12/1054; G06F 2212/608; G06F 2212/65
See application file for complete search history.

(56) References Cited

U.S. PATENT DOCUMENTS

| | | | |
|---|---|---|---|
| 7,421,562 B2 | 9/2008 | Bhatt et al. | |
| 7,793,070 B2 | 9/2010 | Stecher | |
| 8,775,752 B2 | 7/2014 | Yoshida et al. | |
| 2007/0294494 A1 | 12/2007 | Conti et al. | |
| 2011/0082962 A1* | 4/2011 | Horovitz ............... | G06F 11/301 711/6 |
| 2012/0221768 A1 | 8/2012 | Bagal et al. | |

* cited by examiner

*Primary Examiner* — Yong Choe
(74) *Attorney, Agent, or Firm* — Renaissance IP Law Group LLP

(57) ABSTRACT

Embodiments of the inventive concept can include a multi-stage mapping technique for a page cache controller. For example, a gigantic virtual page address space can be mapped to a physical page address efficiently, both in terms of time and space. An internal mapping module can implement a mapping technique for kernel virtual page address caching. In some embodiments, the mapping module can include integrated balanced skip lists and page tables for mapping sparsely populated kernel virtual page address space or spaces to physical block (i.e., page) address space or spaces. The mapping module can automatically and dynamically convert one or more sections from a skip list to a page table, or from a page table to a skip list. Thus, the kernel page cache can be extended to have larger secondary memory using volatile or non-volatile page cache storage media.

13 Claims, 10 Drawing Sheets

PAGE CACHE DEVICE AND METHOD FOR EFFICIENT MAPPING

RELATED APPLICATION DATA

This application claims the benefit of U.S. Patent Application Ser. No. 62/082,596, filed Nov. 20, 2014, which is hereby incorporated by reference.

BACKGROUND

The present inventive concept relates to memory page caches, and more particularly, to a page cache device and method for efficient memory page mapping.

Today, most operating system (OS) kernels or hypervisors utilize parts of dynamic random access memory (DRAM) as a page cache for frequently-used, volatile user data, file system data, and so forth. Because DRAM is significantly more expensive than negative-AND (NAND) memory, most data center servers have limited amounts of DRAM, for cost considerations.

Some applications, particularly big data applications, can benefit from having a much larger working set stored in a DRAM page cache. When the application working set exceeds the amount of DRAM available for page caching, the kernel and hypervisor (hereinafter referred to as kernel for both) uses a least recently used (LRU), or similar, replacement policy to evict cache pages from DRAM to secondary storage. Because the secondary storage is much slower than DRAM (e.g., more than 100 times slower), there is significant overhead in dealing with the disparity between DRAM and secondary storage access speed. As storage or memory devices, both volatile and non-volatile, become faster, the processing complexity overhead incurred becomes a significant processing cost factor.

Conventional memory page mapping techniques require a complex host interface and are inefficient in mapping huge virtual address spaces to size-limited physical address spaces. As demand for large memory address spaces continues to increase with time, the problems with cost and efficiency will continue to persist and even get worse.

Moreover, when a kernel normally works with a storage device, a kernel block layer is invoked to process all input/output (IO)-related requests. The kernel storage layers are subsequently called to forward the request to the IO device's device driver. This processing path is complicated and difficult to achieve high IO device performance for the most frequent JO request patterns. When the IO request patterns change, the processing path must also change, otherwise a performance penalty is incurred. Embodiments of the present inventive concept address these and other limitations in the prior art.

BRIEF SUMMARY

Embodiments of the inventive concept can include a request receiving module configured to receive a request including a virtual memory page address, and a mapping module including a skip list and a page table. At least one of the skip list or the page table can be configured to map the virtual memory page address to a physical memory page address.

Embodiments of the inventive concept can include a computer-implemented method for efficiently mapping memory pages. The method can include receiving, by a request receiving module, a request including a virtual memory page address. The method can include mapping, by at least one of a skip list of a mapping module or a page table of the mapping module, the virtual memory page address to a physical memory page address. The method can include dynamically converting, by a mapping logic section of the mapping module, a section of the skip list to the page table.

Embodiments of the inventive concept can include a system for efficiently mapping memory pages. The system can include a plurality of clients, an interconnect, and a server that is communicatively coupled to the plurality of clients via the interconnect. The server can include a non-volatile storage device, and a page cache controller configured to receive a plurality of requests from the plurality of clients, and to communicate with the non-volatile storage device. The page cache controller can include a request receiving module configured to receive the plurality of requests each including a virtual memory page address, and a mapping module including a skip list and a page table. At least one of the skip list or the page table can be configured to map the virtual memory page address of each of the plurality of requests to a corresponding physical memory page address.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
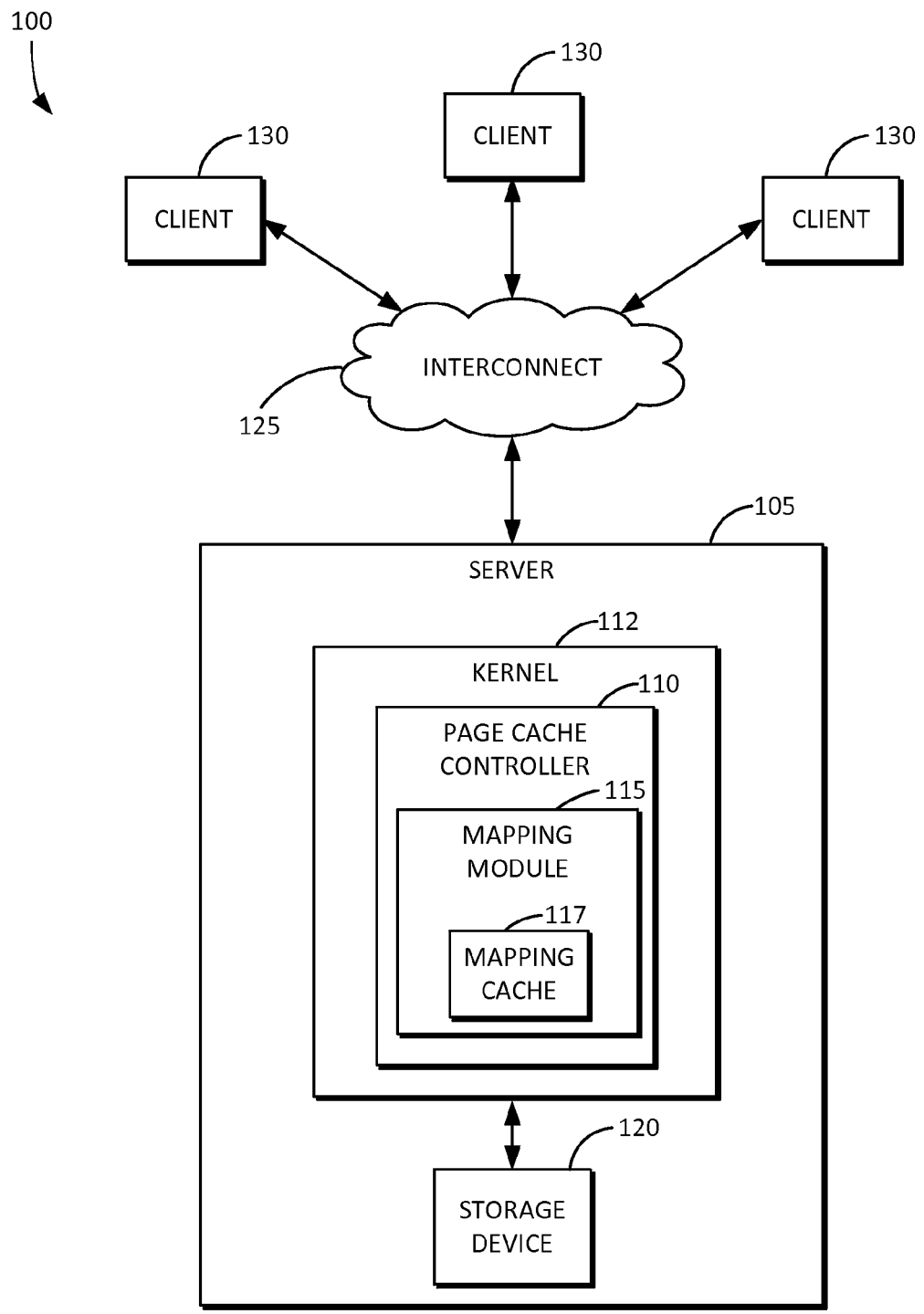
FIG. 1 is an example block diagram of a computing system including a server having a page cache controller with a mapping module in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept as described herein can include a secondary page cache device for a main memory page cache, which reduces kernel code complexity and increases memory page mapping efficiency. Embodiments of the inventive concept can include a multi-stage mapping technique that is more flexible and allows optimizing each stage according to its own characteristics. For example, a gigantic virtual page address space can be mapped to a physical page address efficiently, both in terms of time and space. Embodiments of the inventive concept can include an internal mapping module, which can implement a mapping technique for kernel virtual page address caching. In some embodiments, the mapping module can include integrated balanced skip lists and page tables for mapping sparsely populated kernel virtual page address space or spaces to physical block (i.e., page) address space or spaces. The mapping module can automatically and dynamically convert one or more sections from a skip list to a page table, or from a page table to a skip list. Thus, the kernel page cache can be extended to have larger secondary memory using volatile or non-volatile page cache storage media.

FIG. 1 is an example block diagram of a computing system 100 including a server 105 having a page cache controller 110 with a mapping module 115 in accordance with embodiments of the inventive concept. The computing system 100 can include one or more clients 130, an interconnect 125 (e.g., network such as the Internet, a file system, a local memory, or the like), and the server 105. The server 105 can communicate with the plurality of clients 130 via the interconnect 125. The server 105 can include a non-volatile storage device 120. The non-volatile storage device can be flash memory, phase-change random access memory (PCRAM), spin-transfer torque random access memory (STT-RAM), magnetic random access memory (MRAM), resistive random access memory (RRAM), hard disk drives (HDDs) or the like. The server 105 can include an operating system kernel 112. The kernel 112 can include or otherwise be in communication with the page cache controller 110. The page cache controller 110 can include the mapping module 115. The mapping module 115 can include a mapping cache 117.

According to embodiments of the inventive concept, the server 105 need not expose an IO block interface to the kernel 112. Moreover, hardware interfaces need not be fixed. The server 105 can have any suitable hardware interface to interconnect with or to otherwise integrate within a mother board (not shown). For example, the server 105 can include or otherwise communicate with a non-volatile memory express (NVMe) hardware interface, a peripheral component interconnect express (PCIe) interface, a mother board dual in-line memory module (DIMM) connector, a network interface (e.g., interconnect 125), or the like.

Within the kernel 112, when a memory page is normally evicted from a page cache least recently used (LRU) list, the memory page can either be stored in swap space or file system space (not shown). According to embodiments of the inventive concept, the memory page can be evicted to the storage device 120, according to operations performed by the mapping module 115, as further described below. Applications that can run on the server 105 may use a larger working set than the typical main memory page cache can hold, especially when virtualization or big data are involved. According to embodiments of the inventive concept, the performance of the server 105 can be increased and the cost reduced due in part to a secondary memory page mapping cache 117 of the mapping module 115 that can use a lower cost memory component (e.g., flash, PCRAM, MRAM, RRAM, or the like). The mapping module 115 can interface with the storage device 120 to write and read information to and from the storage device 120. The storage device 120 can store information such as user data, mapping index information, mapping skip list information, mapping page table information, and/or meta data for the mapping module 115.

Figure 2:
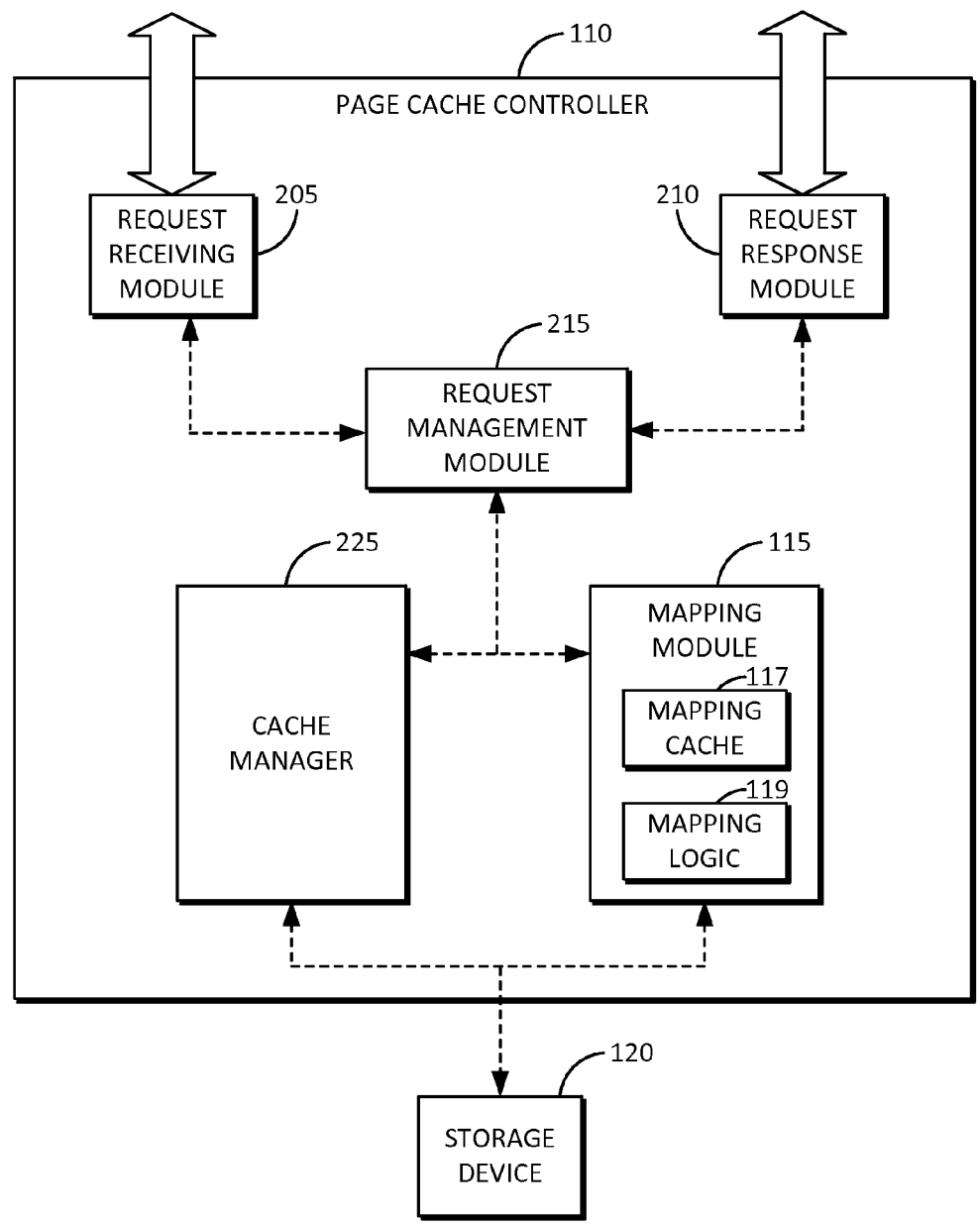
FIG. 2 is an example block diagram of the page cache controller and a storage device of the server of FIG. 1 in accordance with embodiments of the inventive concept.

FIG. 2 is an example block diagram of the page cache controller 110 and the storage device 120 of the server 105 of FIG. 1 in accordance with embodiments of the inventive concept. The page cache controller 110 can include a request receiving module 205 to receive a request including a virtual memory page address. The request receiving module 205 can coordinate the outstanding user requests. The page cache controller 110 can include a request response module 210 to send a response including memory content or data associated with the virtual memory page address. The page cache controller 110 can include a request management module 215 communicatively coupled to the request receiving module 205 and to the request response module 210. The request management module 215 can manage the receiving and the sending of the user requests and the responses, respectively.

The page cache controller 110 can include a cache manager 225 that is communicatively coupled to the request management module 215. The cache manager 225 can cache frequently accessed memory pages. The page cache controller 110 can include the mapping module 115. The mapping module 115 can include the mapping cache 117 and a mapping logic section 119. The mapping module 115 can access the mapping cache 117 at different times and locations during the mapping in which cache hits can be immediately returned to the request management module 215.

Cache misses can be caught by the mapping module 115 and eventually submitted to the storage device 120. Before that occurs, other storage requests may be submitted to the storage device 120 to finish their processing. After the storage device 120 returns the user data, the user data can be returned to the request management module 215 after its cache-ability has been determined.

In accordance with embodiments of the inventive concept, the mapping logic section 119 can dynamically convert a section of a skip list to a page table responsive to first criteria, and dynamically convert a page table to a section of the skip list responsive to second criteria, as further described in detail below. The mapping module 115 can map the virtual memory page address to a physical memory page address, as also further described below. The cache manager 225 and/or the mapping module 115 can interface with the storage device 120, as also further described below.

Figure 3:
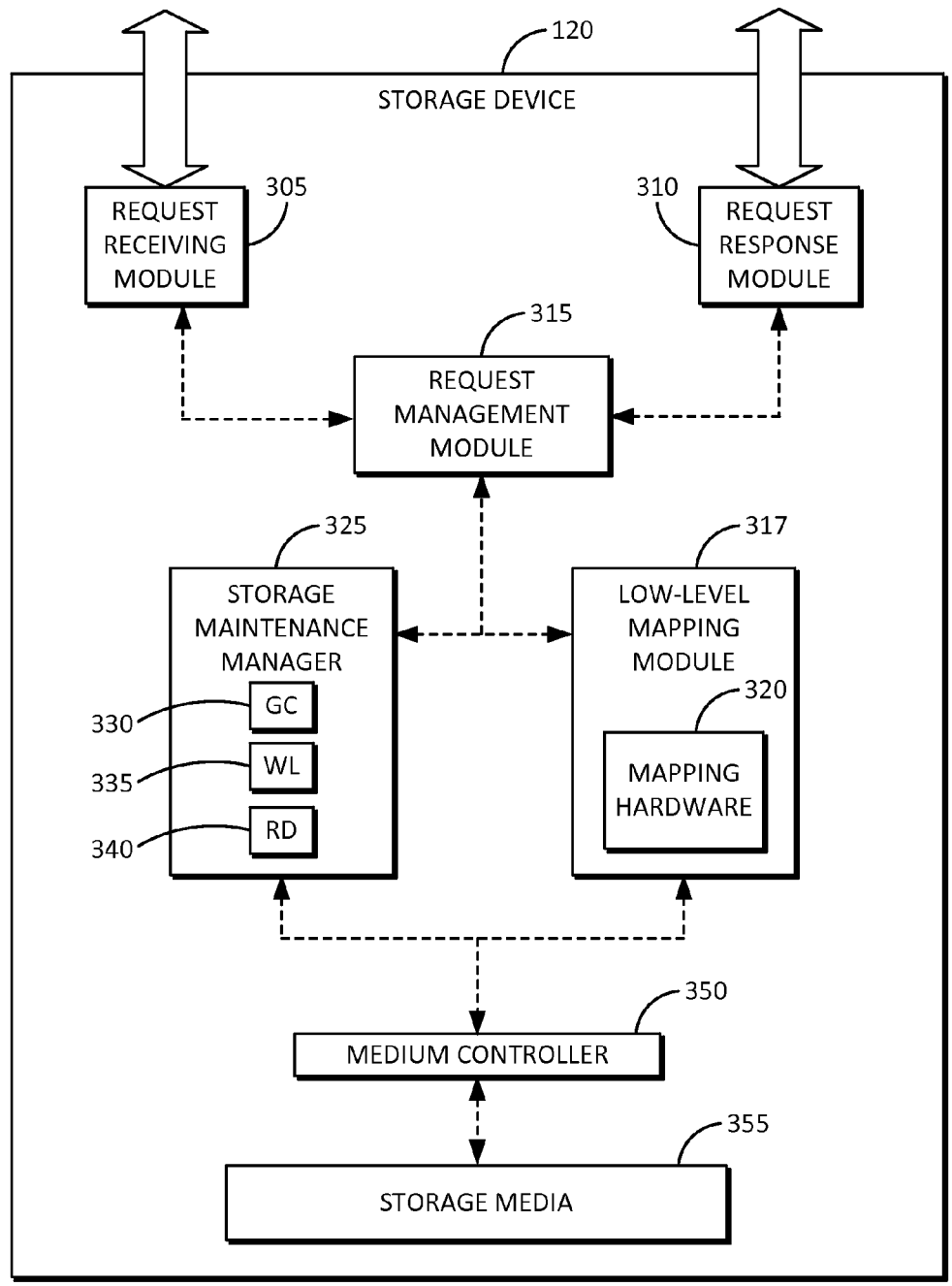
FIG. 3 is an example block diagram of the storage device of FIG. 1 in accordance with embodiments of the inventive concept.

FIG. 3 is an example block diagram of the storage device 120 of FIG. 1 in accordance with embodiments of the inventive concept. The storage device 120 can include a request receiving module 305 to receive a request from the page cache controller 110 including a physical memory page address, and a request response module 310 to respond to the page cache controller 110 with contents of a memory page associated with the physical memory page address. The request management module 315 can be communicatively coupled to the request receiving module 305 and to the request response module 310, and can manage the receiving and sending of the requests and responses, respectively.

The storage device 120 can include a storage maintenance manager 325. The storage maintenance manager 325 can include a garbage collector 330, a wear leveling section 335, and a read disturbance section 340. The storage device 120 can include a low-level mapping module 317 to manage physical memory pages. The low-level mapping module 317 can include mapping hardware 320 for physical memory page mapping and management. The storage maintenance manager 325 and/or the low-level mapping module 317 can interface with storage media 355 via a medium controller 350. The storage media 355 can include a flash memory device, a PCRAM device, an MRAM device, an RRAM device, and HDD device, or the like.

Figure 4:
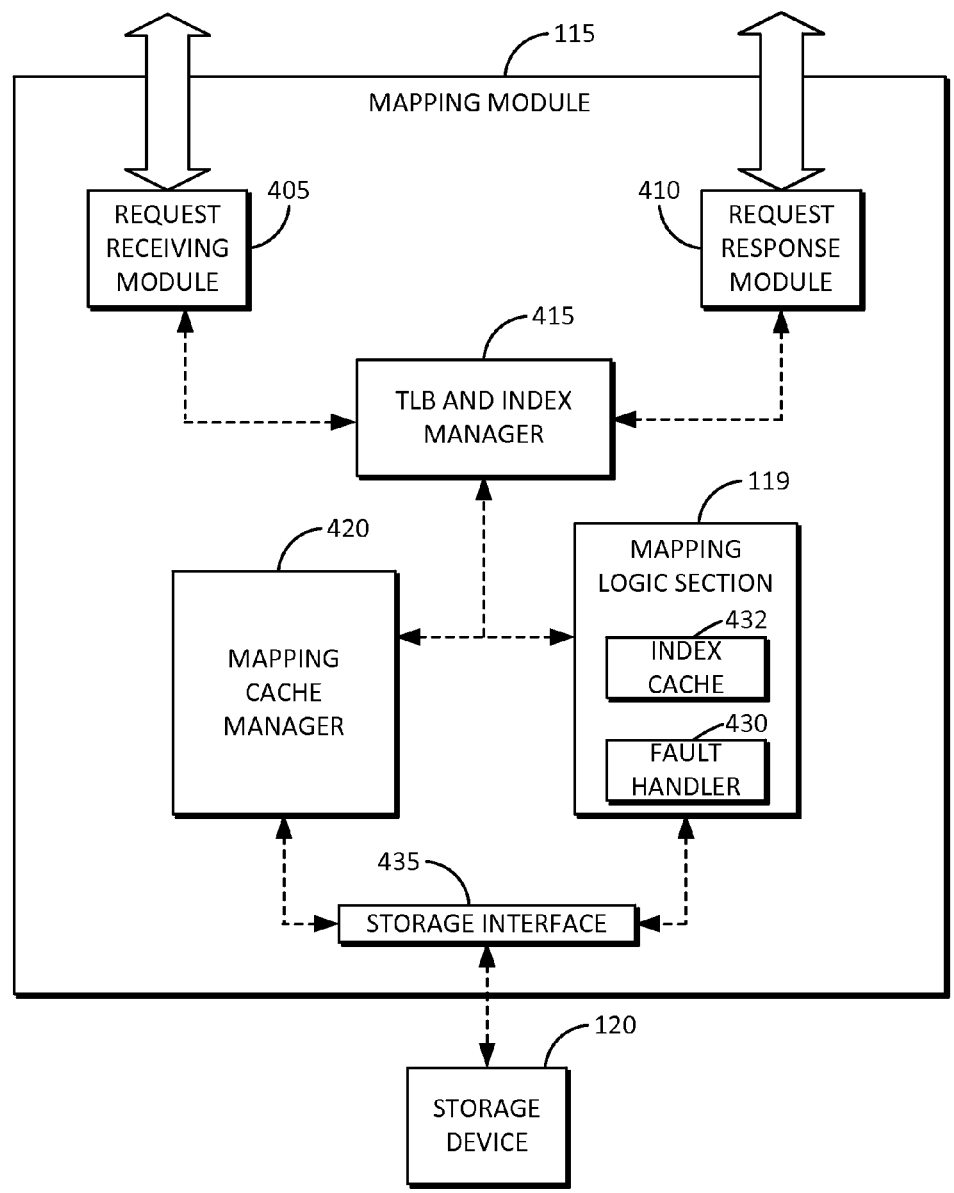
FIG. 4 is an example block diagram of the mapping module of FIG. 1 in accordance with embodiments of the inventive concept.

FIG. 4 is an example block diagram of the mapping module 115 of FIG. 1 in accordance with embodiments of the inventive concept. The mapping module 115 can include a request receiving module 405 to receive the request including the virtual memory page address. The mapping module 115 can include a request response module 410 to send the response including the memory content or data associated with the virtual memory page address. The mapping module 115 can include a translation look-aside buffer (TLB) and index manager 415 that is communicatively coupled to the request receiving module 405 and to the request response module 410. The TLB and index manager 415 can immediately return the memory content or data associated with the virtual memory page address when a corresponding memory page is cached within the TLB 415.

The mapping module 115 can include a mapping cache manager 420 that is communicatively coupled to the TLB and index manager 415. The mapping cache manager 420 can cache frequency accessed memory pages. The mapping module 115 can include the mapping logic section 119. The mapping logic section 119 can include an index cache 432 and a fault handler 430 to handle requests for memory pages that are not yet cached. The mapping module 115 can include a storage interface 435 that is communicatively coupled to the mapping cache manager 420 and to the mapping logic section 119, and configured to interface with the non-volatile storage device 120.

When a request is received at the request receiving module 405, the TLB and index manager 415 can lookup the memory address to determined whether it exists in the TLB 415. If so, the request response module 410 can immediately return the memory content or data associated with the virtual memory address. Otherwise, if not, the mapping cache manager 420 can determine whether the memory address exists in the mapping cache manager 420, and if not, the mapping logic section 119 can map the virtual memory address to a physical memory address. The mapping logic section 119 can request the memory contents or data associated with the physical memory address from the storage device 120 via the storage interface 435. The storage interface 435 can notify the fault handler 430 that the memory page is now read from the storage media and is now cached. The mapping logic section 119 can return a virtual address of the requested memory page to the requester via the request response module 410. If the requested memory page becomes a frequently accessed page, the mapping logic section can cause the frequently accessed page to be cached in the TLB and index manager 415.

Figure 5:
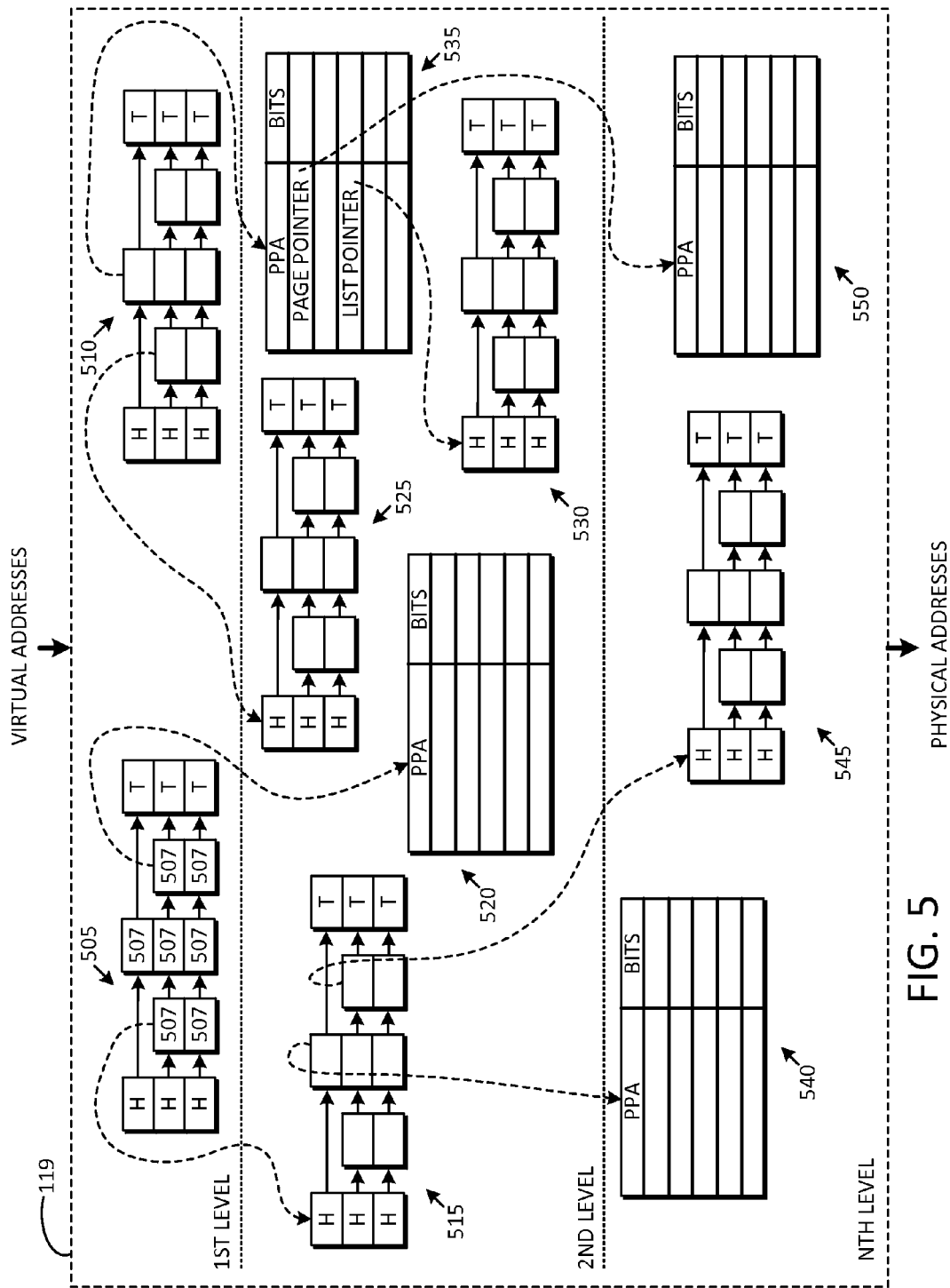
FIG. 5 is a block diagram of a multi-level memory page mapping technique using one or more dynamic page tables and one or more dynamic skip lists in accordance with embodiments of the inventive concept.

FIG. 5 is a block diagram of a multi-level memory page mapping technique that can be performed by the mapping logic section 119 of FIG. 1 using one or more dynamic page tables (e.g., 535) and one or more dynamic skip lists (e.g., 505) in accordance with embodiments of the inventive concept. The one or more dynamic skip lists can each be multi-level skip lists. The skip lists and page tables can be used to achieve both time and space efficiency with run-time self-adaptability.

The one or more skip lists can be divided into logical mapping levels (e.g., 1st level, $2^{nd}$ level, nth level, and so on). Alternatively or in addition, the one or more page tables can be divided into logical mapping levels (e.g., 1st level, $2^{nd}$ level, nth level, and so on). The logical mapping levels can conserve memory. Each level can include the one or more mapping page tables and/or the skip lists. For example, a 1st logical mapping level can include skip lists 505 and 510. A 2nd logical mapping level can include skip lists 515, 525, and 530, and page tables 520 and 535. An Nth logical mapping level can include a skip list 545 and page tables 540 and 550. In some embodiments, the 1st logical mapping level includes only skip lists and no page tables due to the gigantic nature of the virtual address space (e.g., 72 bit, 128 bit, or greater). In some embodiments, the 1st logical mapping level can include skip lists and page tables, as can the other levels. It will be understood that any suitable number of levels can include both skip lists and page tables.

Skip lists conserve memory because a node is not needed for each virtual memory page address—rather, long stretches of unused virtual memory page addresses can be "skipped" within the skip list. In other words, only virtual memory page addresses that are in use can be stored in the skip list. The skip list can be traversed until a point is reached where the mapping is there or not. The traversing of the skip list necessitates multiple read operations. But the space efficiency is considerable, i.e., on the order of $O(n)$ space efficiency. Skip lists also have the feature of easy conversion to a page table. Moreover, frequent insertion, modification, and deletion of nodes can be efficiently performed. Skip lists have the advantage of a simpler implementation relative to page tables while maintaining the same search, insertion, and deletion operations as comparable to balanced binary trees or similar data structures. Skip lists can perform at the $O(\log n)$ level. A balanced skip list is a skip list that has the best search performance and has the same or similar structure as a balanced binary tree.

Page tables also conserve memory. Page tables are advantageous because they are faster than skip lists. Page tables have a one-to-one correspondence between a particular virtual memory page and its mapping. Therefore, a single read operation of memory can be performed to obtain the mapping. It will be understood that each of the logical mapping levels can include or have associated with it any suitable number of skip lists and page tables.

Nodes (e.g., 507) can be inserted into the skip lists (e.g., 505). As more nodes 507 are inserted into a particular skip list 505, the mapping logic section 119 can select a node range to be stored into a page table (e.g., 520) to control either the number of nodes or search performance. The mapping logic section 119 can dynamically convert a section (e.g., group of nodes) of a skip list (e.g., 505) to a page table (e.g., 520) responsive to the skip list 505 having a populated density of nodes that is greater than a predefined populated density threshold. For example, if the skip list 505 has a populated density of greater than 80% or thereabout, the mapping logic section 119 can dynamically convert the section of the skip list 505 to the page table 520. The populated density can be determined relative to the total number of possible nodes within the skip list, or relative to a predefined total number of nodes within the skip list. By way of another example, the mapping logic section 119 can dynamically convert the section of the skip list 505 to the page table 520 responsive to the skip list 505 having a search time that is greater than a predefined search time threshold.

Conversely, the mapping logic section 119 can dynamically convert the page table (e.g., 520) to a section of a skip list (e.g., 505). For example, the mapping logic section 119 can dynamically convert the page table 520 to a section of the skip list 505 responsive to the page table 520 having a populated density of entries that is less than a predefined populated density threshold. For example, when the page table 520 has a populated density of entries that is less than 10% or thereabout, the mapping logic section 119 can dynamically convert the page table 520 to the section of the skip list 505. The difference between the predefined populated density threshold of the skip list (e.g., 80%) and the predefined populated density threshold of the page table (10%) avoids thrashing (i.e., conversions that might otherwise be carried out too frequently) between the skip list and the page table. Conversions can have varying degrees of laziness to avoid thrashing caused by conversion. By way of another example, the mapping logic section 119 can dynamically convert the page table 520 to the section of the skip list 505 responsive to the page table 520 having a look up time that is greater than a predefined look up time threshold. The conversion between a skip list and a page table can be self-adaptive, meaning, at run time the conversion can proceed automatically with a method that defines the conversion criteria.

The page tables and skip lists can work in tandem. Empty mapping modules can start with empty skip lists. When address spaces can be logically grouped, there can be multiple top-level empty starting skip lists. As more addresses are added to the skip list, the number of skip lists can be increased. Otherwise, more time is spent traversing the skip list to find a target node. The mapping logic section 119 can search for opportunities to split off a list segment to one or more page tables. When the number of virtual addresses in the skip list exceeds a threshold density or time criteria, the nodes of the skip list can be converted to page tables and one skip list node can mark the fact for later searches. A similar process can apply to address removal. In the case of address removal, when a mapping page table contains few valid mapping entries, the mapping page table can be converted to a skip list. Conversion heuristics for converting between page tables and skip lists can include a space oriented heuristic in which the conversion occurs responsive to the skip list being larger than the page table. Alternatively or in addition, the conversion can occur when the skip list searching is longer than the page table work through or look up. Other techniques can be applied to find conversion opportunities in either direction. For example, consider the following 20-bit address mask:

Address Mask: 0000 1100 1111 0011 1111

In some embodiments, the conversion criteria can be defined as: operation (key ranges of skip list nodes) is a subset of a contiguous key sequence. Applying the operation on the range of skip list nodes can return a sequence of numbers. If the numbers in the sequence are all unique, the conversion is successful. For example, when the operation logically ANDs the constant 0x0000 0000 0000 0070, there can be six (6) contiguous skip list nodes with keys which, when ANDed with the constant 0x0000 0000 0000 0070, all produce a value within a range of {0x0, 0x7}.

It will be understood that while reference is made to the skip list 505 and the page table 520, such dynamic conversions can occur between any of the skip lists (e.g., 505, 510, 515, 525, 530, and 545) and any of the page tables (e.g., 535, 520, 540, and 550). For example, the page table 520 can include a pointer (e.g., PAGE POINTER) to the page table 550. The page table 520 can include a pointer (e.g., LIST POINTER) to the skip list 530. It will be understood that the page tables can each include two or more pointers to two or more additional page tables. Alternatively or in addition, it will be understood that the page tables can each include two or more pointers to two or more additional skip lists. The type of pointer can be stored in the BITS section of the table for each pointer. Each page table can be aligned on a predefined memory boundary (e.g., 4 kilobyte boundary) so that the BITS field can be used to store additional information such as the pointer type. The BITS field can include, for example, 12 bits of information. The BITS field can include other attributes or flags, such as read-only, write-only, and so forth. Each page table can include mapping information for multiple memory pages, which can occupy the majority of the page table entries. For example, each page table can include entries that map virtual memory page addresses to physical memory page addresses.

Moreover, the skip list (e.g., 505) can include a pointer (e.g., PAGE POINTER) to the page table 520. The skip list (e.g., 505) can include a pointer (e.g., LIST POINTER) to the skip list 515 stored in a skip list node. It will be understood that the skip lists can each include two or more pointers stored in different skip list nodes to two or more additional page tables. Alternatively or in addition, it will be understood that the skip lists can each include two or more pointers stored in different skip list nodes to two or more additional skip lists. The type of pointer can be stored in the corresponding nodes of the skip list for each pointer. Each node can include additional information, such as pointer type, stored in the nodes. Each skip list can include mapping information for multiple memory pages, which can occupy the majority of the skip list nodes. For example, each skip list can include nodes that map virtual memory page addresses to physical memory page addresses.

The mapping cache 117 (of FIG. 1) can include the page tables, the skip lists, and/or user data caches. The skip lists (e.g., 505, 510, 515, 525, 530, and 545) and the page tables (e.g., 535, 520, 540, and 550) need not all fit within the mapping module's mapping cache 117. The fault handler 430 can handle page faults, list faults, and/or page table faults. In other words, one or more of the skip lists can be removed from the mapping cache 117 and stored in a secondary storage (e.g., 120), or vice versa. Alternatively or in addition, one or more page tables can be removed from the mapping cache 117 and stored in the secondary storage 120, or vice versa. The mapping logic section 119 can use an index cache 432 to accelerate searching page tables and/or skip lists that exist on the secondary storage 120. When a skip list is loaded to the mapping cache 117 from the secondary storage 120, a balanced skip list can be generated if a rebuild is needed. In some embodiments, the mapping logic section 119 can cause a compaction process to compact sparse page tables into sparse skip lists. The compaction can be a lazy compaction. Where the secondary storage 120 is sufficiently high performing, less DRAM can be used within the mapping module's mapping cache 117.

An example mapping technique can include a look up technique. When a user attempts to access a particular byte or group of bytes within a file, and the byte or group of bytes is not yet in memory, the kernel (e.g., 112 of FIG. 1) can determine an inode number in a file system. From the inode number and offset in the inode, the kernel 112 can form a virtual page address. A typical page address is 4 kilobytes. A virtual page address can be comprised of an address space identifier (ASI), an object handle (HDL), and a page identifier (PGID). The ASI can be a category of, or a container for, similar objects, such as processes, shared libraries, and/or file systems. The HDL can be within an address space, a file in the file system, and/or a process heap. The PGID can exist for each data page for a particular object. The ASI and HDL can use one skip list, while the PGID can use another different skip list. The PGID skip list can be converted to a mapping page table when necessary, for example, when the space for a skip list is larger than required for a mapping page table. Another example considers performance, for example, when the skip list becomes too long or the mapping table has hardware acceleration, mapping page tables can be used.

A typical inode number is 16 bits. The virtual page address can be submitted to the mapping module (e.g., 115 of FIG. 1). If a match of the virtual page address is found in the TLB and index manager 415, a corresponding mapped physical page address can be used to read the block from the storage device 120 and return the read block to the user or client. If a miss of the virtual page occurs (i.e., the virtual page is not cached within the TLB), an entry can be evicted and, if dirty, a cache update can be performed. A physical page address is more akin to a physical block address in the storage device 120.

Referring to FIGS. 4 and 5, a look up in the mapping cache 117 can be performed. If the mapping cache 117 also experiences a look up miss, either an interrupt can be issued to satisfy the request from the non-volatile storage 120, or the mapping logic section 119 can cause the non-volatile storage device 120 to be searched. The mapping logic section 119 can search a dedicated skip list area. The skip list can be traversed for a match. When a match is found, the corresponding mapping page table or skip list can be brought into the mapping cache 117, and an in-memory hash table can be modified to point to the corresponding mapping page table or skip list in memory. A dirty map page can be evicted from the in-memory structure, and the corresponding entries in the non-volatile page table or skip list can be modified to reflect the change. Skip list expansion can cause a page table conversion. Conversely, if a match is not found, this means that the requested memory page is not yet created. In this case, the skip list and page tables can expand. Invalidation requests can go through a same or similar process. At the end of an operation, skip lists or page tables can shrink. Page table shrinkage can cause a skip list conversion.

The mapping module 115 can implement an efficient (in both time and space) mapping and page cache insertion, modification, and/or deletion with high frequency. Mapping performance is important when satisfying host requests. The mapping module 115 can manage self-adaptive, multi-level skip lists for sparsely cached objects, and multi-level mapping page tables for densely cached objects. Non-volatile storage (e.g., 120) can store mapping data, but this can be expensive. Sparse handle space might incur a large mapping table that is only sparsely populated. The mapping module 115 can accommodate the caching of objects with varying reference frequencies. The mapping module 115 can take the requesting virtual page address as input, and convert the virtual page address into a physical page address. The mapping module 115 can work together with the cache subsystem (e.g., cache manager 225 of FIG. 2) and the TLB and index manager (e.g., 415 of FIG. 4). In some embodiments, the cache subsystem and TLB manager can be included as part of the mapping module 115.

Figure 6A:
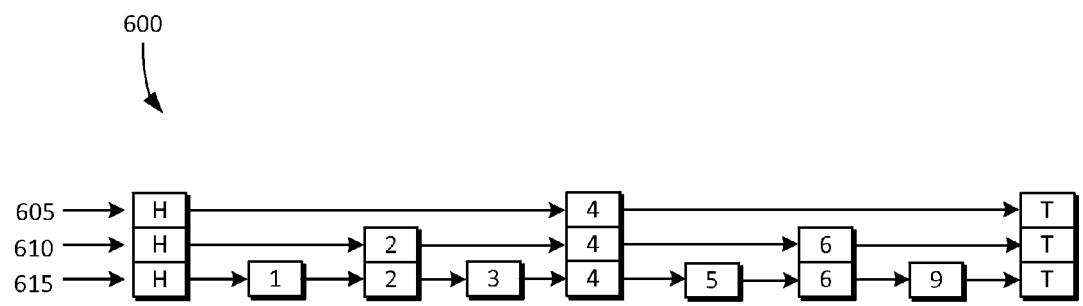
FIG. 6A is an example block diagram of a multi-level skip list in accordance with embodiments of the inventive concept.
Figure 6B:
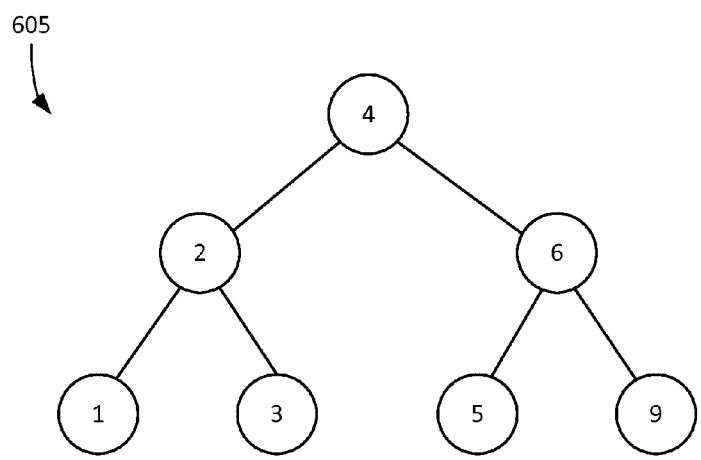
FIG. 6B is an example block diagram of a balanced binary tree for analogizing performance of the multi-level skip list of FIG. 6A in accordance with embodiments of the inventive concept.

FIG. 6A is an example block diagram of a multi-level skip list in accordance with embodiments of the inventive concept. FIG. 6B is an example block diagram of a balanced binary tree for analogizing performance of the multi-level skip list of FIG. 6A in accordance with embodiments of the inventive concept. Reference is now made to FIGS. 6A and 6B.

A balanced skip list 600 can have the same or similar performance relative to a balanced binary tree 605. For example, if node 5 is the target node then 5 is the target value, and the first row 605 of the multi-level skip list 600 can first be traversed. More specifically, node 4, which is between the head H and tail T of row 605, can be compared to the target value of 5. Since the target value of 5 is greater than 4, the next row 610 is traversed between the node 4 and the tail T. The target value of 5 is less than node 6, so the next row 615 is traversed between the node 4 and the node 6, which arrives at node 5, the target node.

Similarly with respect to the balanced binary tree 605, if the node 5 is the target node, then the target value is 5. The target value of 5 can be compared to the top node 4 in the binary tree. Since 5 is greater than 4, the branch to the right of 4 can be followed. Since the target value of 5 is less than node 6, the next branch to the left of 6 can be followed, which arrives at node 5, the target node.

As mentioned above, a balanced skip list is a skip list that has the best search performance and has the same or similar structure as a balanced binary tree. Compared to a binary tree with respect to deletion of a node, the skip list deletion can have a fixed number of operations no matter where the node is located in the skip list. This can also be the case for node insertion.

Figure 7:
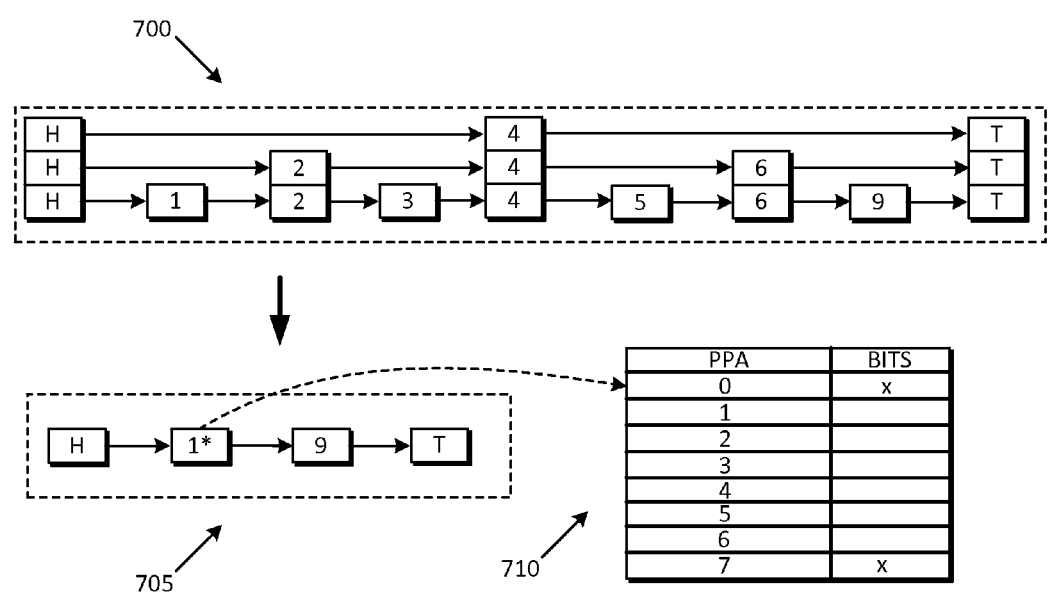
FIG. 7 is an example block diagram of a dynamic conversion of a section of a multi-level skip list to a page table in accordance with embodiments of the inventive concept.

FIG. 7 is an example block diagram of a dynamic conversion of a section 705 of a multi-level skip list 700 to a page table 710 in accordance with embodiments of the inventive concept. When, for example, the skip list 700 has met certain criteria such as having a sufficiently dense node population, the section 705 of the skip list 700 can be converted to the page table 710. Conversely, a sparsely populated page table can be dynamically converted to a skip list or a section of a skip list. More specifically, the third row of the multi-row skip list 700 containing the nodes 1, 2, 3, 4, 5, 6, and 9 can be shortened such that nodes 1, 2, 3, 4, 5, and 6 are inserted into the page table 710. The third row of the multi-row skip list 700 can therefore have a head H, a node having a pointer 1* to the page table 710, a node 9, and the tail T. In the page table 710, the nodes 0 and 7 can be null or unused entries. The conversion can happen not only with single-level skip lists, but also with multi-level skip lists and page table combinations. In some embodiments, a virtual address divider for the virtual address space can be implemented. The virtual address divider can create different properties for virtual address space segments, which prohibit the conversion using operations spanning across the bits of the address. For example, a heap space of a particular process can be different from a file system's file space. Hence, rather than create a page table that spans both heap space and file spaces, the conversion technique described herein can be used.

Figure 8:
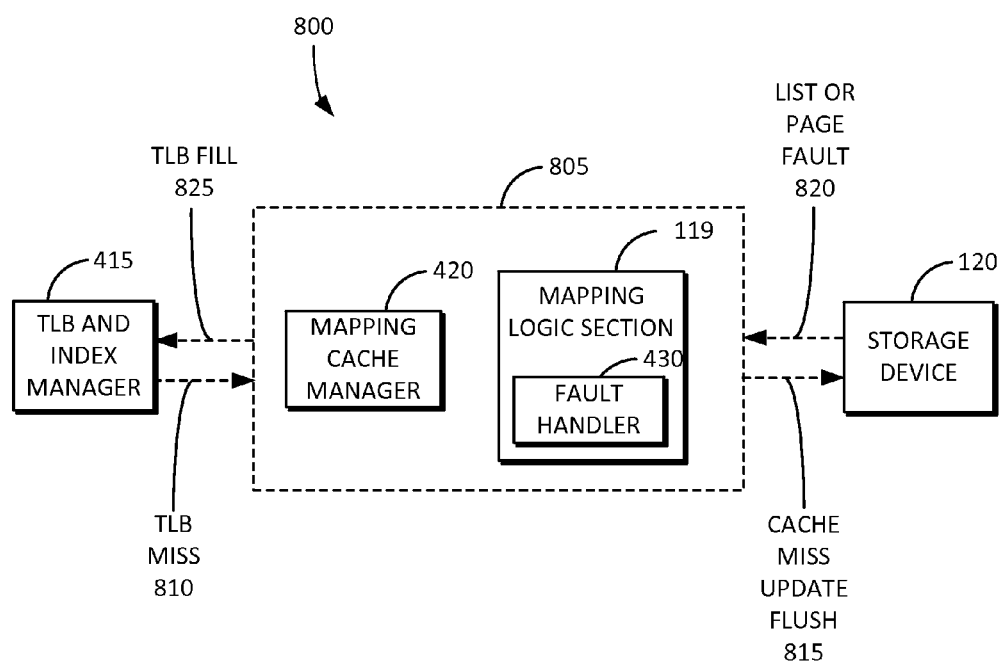
FIG. 8 is an example flow and block diagram of a memory page table mapping technique in accordance with embodiments of the inventive concept.

FIG. 8 is an example flow and block diagram 800 of a memory page table mapping technique in accordance with embodiments of the inventive concept. The diagram 800 includes a TLB and index manager 415, a section 805 including a mapping cache manager 420 and/or the mapping logic section 119, and a storage device 120. The following are examples of interactions among these components. The TLB and index manager 415 can experience a miss at 810. The miss at 810 can trigger either a mapping fetch from the mapping cache manager 420 and/or a dirty mapping entry eviction. Cache misses can trigger the mapping logic section 119 to look for a mapping page table on the non-volatile storage device 120, as indicated by the cache miss update flush 815. The storage device 120 can return a list or page fault at 820. A TLB fill can be returned at 825 to the TLB and index manager 415. Dirtied mapping entries can be flushed to the non-volatile storage device 120 periodically or as needed. The non-volatile storage device 120 can include a superset of data contained in upper levels (e.g., TLB and caches).

Figure 9:
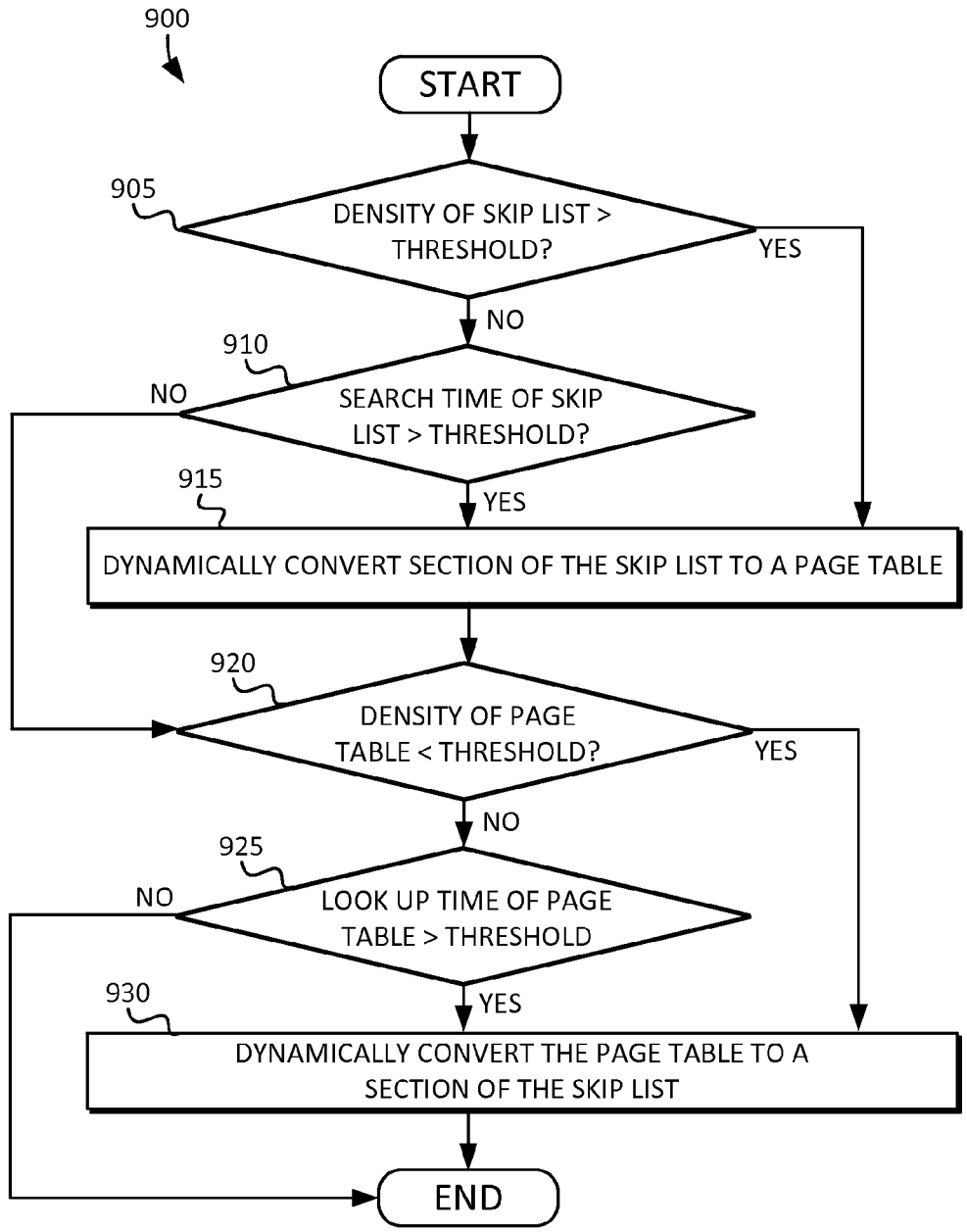
FIG. 9 is a flow chart illustrating a technique for efficiently mapping memory pages in accordance with embodiments of the inventive concept.

FIG. 9 is a flow chart 900 illustrating a technique for efficiently mapping memory pages in accordance with embodiments of the inventive concept. After receiving a request including a virtual memory page address, the virtual memory address can be mapped, by at least one skip list and/or at least one page table of the mapping module, to a physical memory page address. When a particular skip list becomes too densely populated, or a particular page table becomes too sparsely populated, among other criteria as described above, a conversion can occur between the skip list and the page table. At 905, a determination can be made whether a populated density of the skip list is greater than a predefine populated density threshold. If yes, the flow can skip to 915, where a section of the skip list can be dynamically converted to a page table. Otherwise, if no, the flow can proceed to 910 where another determination can be made whether a search time of the skip list is greater than a predefined search time threshold. If yes, the flow can proceed to 915, where a section of the skip list can be dynamically converted to a page table. Otherwise, if no, the flow can skip to 920.

At 920, another determination can be made whether the density of the page table is less than a predefined populated density threshold. If yes, the flow can skip to 930, where the page table can be dynamically converted to a section of the skip list. Otherwise, if no, the flow can proceed to 925, where another determination can be made whether a look up time of the page table exceeds a predefined look up time threshold. If yes, the flow can proceed to 930, where the page table can be dynamically converted to a section of the skip list. Otherwise, if no, then the technique can end.

It will be understood that the steps shown in FIG. 9 need not occur in the illustrated order, but can occur in a different order, or within intervening steps between the steps that are shown and described.

Figure 10:
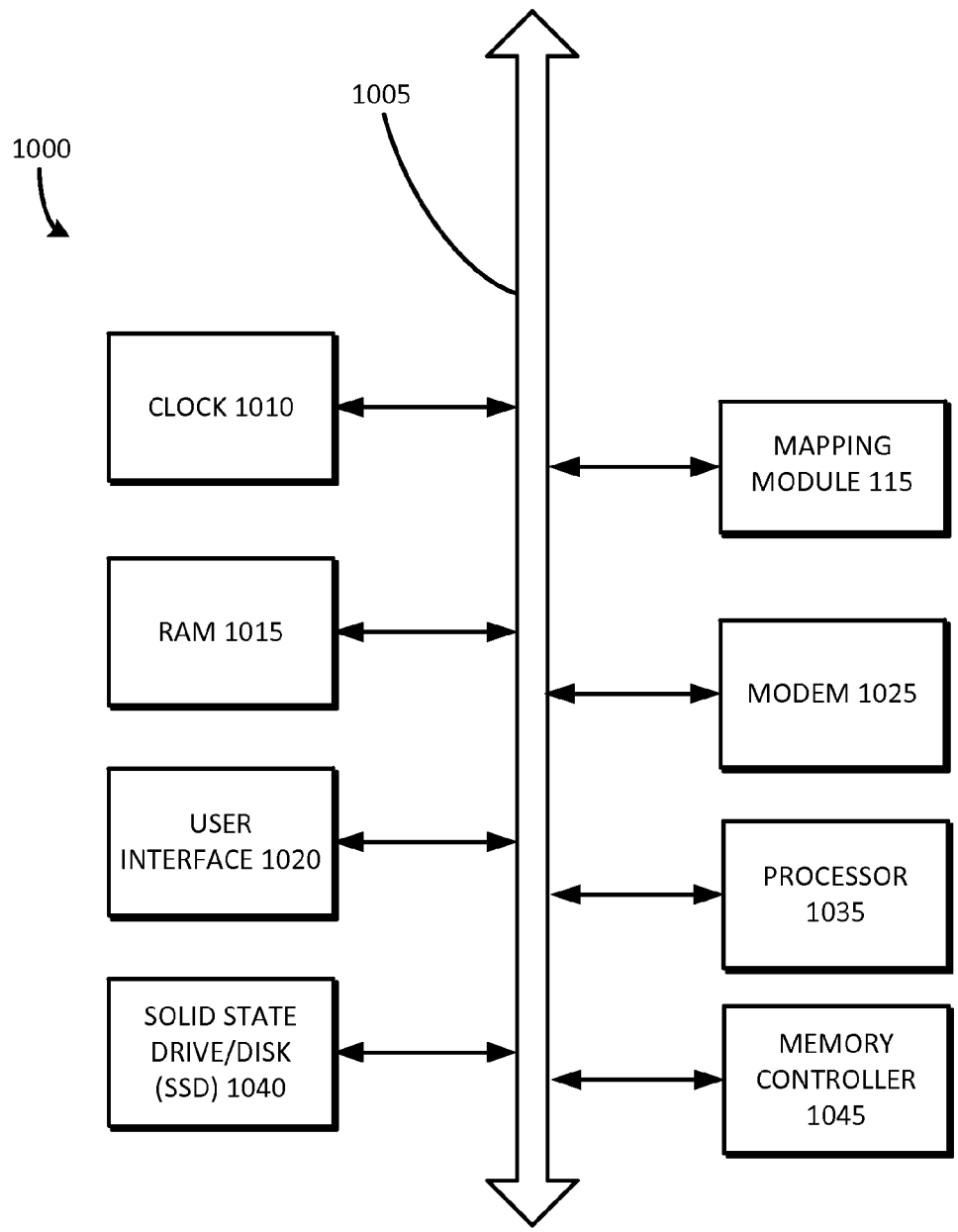
FIG. 10 is a block diagram of a computing system including the mapping module of FIG. 1.

FIG. 10 is a block diagram of a computing system 1000 including the mapping module 115 of FIG. 1. Referring to FIG. 10, the computing system 1000 may include a clock 1010, a random access memory (RAM) 1015, a user interface 1020, a modem 1025 such as a baseband chipset, a solid state drive/disk (SSD) 1040, a memory controller 1045, and/or a processor 1035, any or all of which may be electrically coupled to a system bus 1005. The mapping module 115 can correspond to that described in detail above, and as set forth herein, and may also be electrically coupled to the system bus 1005. The mapping module 115 can include or otherwise interface with the clock 1010, the random access memory (RAM) 1015, the user interface 1020, the modem 1025, the solid state drive/disk (SSD) 1040, the memory controller 1045, and/or the processor 1035.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A page cache controller, comprising:
   a request receiving module configured to receive a request including a virtual memory page address; and
   a mapping module including a skip list or a page table, wherein at least one of the skip list or the page table is configured to map the virtual memory page address to a physical memory page address,
   wherein the mapping module further includes a mapping logic section configured to dynamically convert a section of the skip list to the page table; and
   wherein the mapping logic section is configured to dynamically convert the section of the skip list to the page table responsive to at least one of:
      the skip list having a populated density of nodes that is greater than a predefined populated density threshold; or
      the skip list having a search time that is greater than a predefined search time threshold.

2. The page cache controller of claim 1, wherein the predefined populated density threshold is 80% or thereabout.

3. The page cache controller of claim 1, wherein:
   the page table is referred to as a first page table;
   the skip list is referred to as a first skip list; and
   the mapping module further includes a second page table and a second skip list.

4. The page cache controller of claim 3, wherein:
   the first page table includes a first pointer to the second page table; and
   the first page table includes a second pointer to the second skip list.

5. The page cache controller of claim 3, wherein:
   the mapping module further includes a third page table and a third skip list;
   the second skip list includes a first pointer to the third page table; and
   the second skip list includes a second pointer to the third skip list.

6. The page cache controller of claim 1, wherein the skip list is a multi-level skip list.

7. A page cache controller, comprising:
   a request receiving module configured to receive a request including a virtual memory page address; and
   a mapping module including a skip list or a page table, wherein at least one of the skip list or the page table is configured to map the virtual memory page address to a physical memory page address,
   wherein the mapping module further includes a mapping logic section configured to dynamically convert the page table to a section of the skip list; and
   wherein the mapping logic section is configured to dynamically convert the page table to the section of the skip list responsive to at least one of:
      the page table having a populated density of entries that is less than a predefined populated density threshold; or
      the page table having a look up time that is greater than a predefined look up time threshold.

8. The page cache controller of claim 7, wherein the predefined populated density threshold is 10% or thereabout.

9. A page cache controller, comprising:
   a request receiving module configured to receive a request including a virtual memory page address;
   a mapping module including a skip list or a page table, wherein at least one of the skip list or the page table is configured to map the virtual memory page address to a physical memory page address;
   a request response module configure to send a response including memory content associated with the virtual memory page address;
   a request management module coupled to the request receiving module and to the request response module, configured to manage the receiving and the sending of the request and the response, respectively; and
   a cache manager coupled to the request management module and configured to cache frequently accessed memory pages,
   wherein the mapping module further includes a mapping logic section configured to dynamically convert a section of the skip list to the page table responsive to first criteria, and to dynamically convert the page table to the section of the skip list responsive to second criteria.

10. The page cache controller of claim 9, wherein the mapping module further comprises:
    a translation look-aside buffer and index manager coupled to the request receiving module, configured to immediately return the memory content associated with the virtual memory page address when a corresponding memory page is cached within the translation look-aside buffer;
    a mapping cache manager coupled to the translation look-aside buffer and index manager, configured to cache frequently accessed memory pages; and a storage interface coupled to the mapping cache manager and to the mapping logic section, configured to interface with a non-volatile storage device.

11. A computer-implemented method for efficiently mapping memory pages, the method comprising:
   receiving, by a request receiving module, a request including a virtual memory page address;
   mapping, by at least one of a skip list of a mapping module or a page table of a mapping module, the virtual memory page address to a physical memory page address; and
   dynamically converting, by a mapping logic section of the mapping module, a section of the skip list to the page table,
   wherein dynamically converting further comprises:
   dynamically converting, by the mapping logic section of the mapping module, the section of the skip list to the page table responsive to at least one of:
      the skip list having a populated density of nodes that is greater than a predefined populated density threshold; or
      the skip list having a search time that is greater than a predefined search time threshold.

12. A computer-implemented method for efficiently mapping memory pages, the method comprising:
   receiving, by a request receiving module, a request including a virtual memory page address;
   mapping, by at least one of a skip list of a mapping module or a page table of a mapping module, the virtual memory page address to a physical memory page address;
   dynamically converting, by a mapping logic section of the mapping module, a section of the skip list to the page table; and
   dynamically converting, by the mapping logic section of the mapping module, the page table to the section of the skip list responsive to at least one of:
      the page table having a populated density of entries that is less than a predefined populated density threshold; or
      the page table having a look up time that is greater than a predefined look up time threshold.

13. A system for efficiently mapping memory pages, the system comprising:
   an interconnect; and
   a server configured to be communicatively coupled to a plurality of clients via the interconnect, wherein the server includes:
   a non-volatile storage device; and
   a page cache controller configured to receive a plurality of requests from the plurality of clients, and to communicate with the non-volatile storage device, the page cache controller including:
   a request receiving module configured to receive the plurality of requests each including a virtual memory page address; and
   a mapping module including a skip list and a page table, wherein at least one of the skip list or the page table is configured to map the virtual memory page address of each of the plurality of requests to a corresponding physical memory page address,
   wherein:
   the mapping module further includes a mapping logic section configured to dynamically convert a section of the skip list to the page table responsive to at least one of:
      the skip list having a populated density of nodes that is greater than a predefined populated density threshold; or
      the skip list having a search time that is greater than a predefined search time threshold;
   wherein the mapping logic section is further configured to dynamically convert the page table to the section of the skip list responsive to at least one of:
      the page table having a populated density of entries that is less than a predefined populated density threshold; or
      the page table having a look up time that is greater than a predefined look up time threshold.

* * * * *